US006816975B1

(12) United States Patent
Sasaki et al.

(10) Patent No.: US 6,816,975 B1
(45) Date of Patent: Nov. 9, 2004

(54) STATUS DISPLAY FOR TEMPERATURE REGULATION OF PROCESSING UNIT USING LEDS OF DIFFERENT COLOR

(75) Inventors: Dai Sasaki, Tokyo (JP); Toru Akazawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 434 days.

(21) Appl. No.: 09/656,652

(22) Filed: Sep. 7, 2000

(30) Foreign Application Priority Data

Sep. 10, 1999 (JP) ......................................... P11-256567
Aug. 30, 2000 (JP) ..................................... P2000-260712

(51) Int. Cl.[7] ................................................. G06F 1/26
(52) U.S. Cl. ....................... 713/300; 340/584; 361/103; 700/299
(58) Field of Search .......................... 713/300; 714/14; 361/103; 340/631, 584; 700/299

(56) References Cited

U.S. PATENT DOCUMENTS

| | | | |
|---|---|---|---|
| 5,664,118 A | | 9/1997 | Nishigaki et al. |
| 5,835,885 A | | 11/1998 | Lin |
| 5,864,465 A | * | 1/1999 | Liu ............................ 361/697 |
| 5,886,408 A | | 3/1999 | Ohki et al. |
| 5,915,232 A | | 6/1999 | McMinn |
| 5,930,110 A | | 7/1999 | Nishigaki et al. |
| 6,014,611 A | * | 1/2000 | Arai et al. .................. 702/132 |
| 6,023,402 A | * | 2/2000 | Kaminski .................... 361/103 |
| 6,143,590 A | | 11/2000 | Ohki et al. |
| 6,225,911 B1 | * | 5/2001 | Nagamasa et al. .......... 340/635 |
| 6,463,396 B1 | | 10/2002 | Nishigaki |
| 6,701,273 B2 | | 3/2004 | Nishigaki et al. |

FOREIGN PATENT DOCUMENTS

| | | |
|---|---|---|
| CN | 2336366 | 9/1999 |
| EP | 0730217 A1 * | 4/1996 |
| JP | 06-038357 | 2/1994 |
| JP | 07-302136 | 11/1995 |
| JP | 08-078618 | 3/1996 |
| JP | 08-292819 | 11/1996 |
| JP | 09-284988 | 10/1997 |
| JP | 10-312226 | 11/1998 |
| JP | 11-085323 | 3/1999 |
| TW | 212841 | 9/1993 |

OTHER PUBLICATIONS

Lundquist et al., "Microprocessor–based adaptive thermal control for an air–cooled computer CPU module" Semiconductor Thermal Measurement and Management, 2001. Seventeenth Annual IEEE Symposium On page(s): 168–173□□.*

* cited by examiner

Primary Examiner—Thomas Lee
Assistant Examiner—Albert Wang
(74) Attorney, Agent, or Firm—Katten Muchin Zavis Rosenman

(57) ABSTRACT

An electronic device has a temperature sensor that detects temperature of a CPU, an image processing unit, and a microprocessor unit that controls the supply of electric power from a power source unit to the CPU and the image processing unit according to the temperature detected by the temperature sensor. If the temperature of the CPU and/or the image processing unit is detected by the temperature sensor to be near the temperature that causes malfunction or damage to them, the supply of electric power to the CPU and the image processing unit is automatically stopped by the microprocessor unit. It is possible to prevent malfunction and damage of the CPU and the image processing unit and to easily prevent the occurrence of runaway programs, etc.

5 Claims, 11 Drawing Sheets

DETAILED FLOW OF STEP 70 IN FIGURE 10

STATUS DISPLAY FOR TEMPERATURE REGULATION OF PROCESSING UNIT USING LEDS OF DIFFERENT COLOR

FIELD OF THE INVENTION

This invention relates to an electronic device which has a central processing unit that performs calculation-processes software information that is input, and a power source unit that supplies electric power to the central processing unit.

BACKGROUND OF THE INVENTION

Video game devices, personal computers, and other electronic devices have long required faster processing capacity for calculation processing in calculation processing devices such as a central processing unit (CPU) in order to process at high speed the enormous amount of multimedia information and other software information that are input.

In particular, higher-speed processing in the CPU and image processing unit is required in video game devices in order to process and display detailed images at high speed.

However, when one tries to speed up the processing capacity, as the passing of signals within the CPU becomes faster and the wiring becomes more complicated, the amount of heat generated by the constituent elements increases, and the amount of heat generated by the CPU itself also increases.

The greater heat generated by the CPU can cause the CPU itself to become overheated and operate incorrectly, which can damage it. When the CPU operates incorrectly and is damaged, the program or other software which is being executed on the CPU will come to a halt. Thus what has been desired is a system that can surely prevent malfunction (or misoperation) and damage caused by overheating of the CPU.

Apart from CPUs, the same problem occurs in image processing units for which faster processing capacity is wanted.

SUMMARY OF THE INVENTION

It is an object of this invention to provide an electronic device that can easily prevent malfunction of and damage to the calculation processing device.

An electronic device according to the present invention includes a calculation processing unit that calculation-processes software information that is input therein; a power source unit that supplies electric power to the calculation processing unit. The electronic device includes a temperature detection means that detects a temperature of said calculation processing unit; and a power control means that controls the supply of electric power from the power source unit to the calculation processing unit according to the temperature detected by the temperature detection means.

With the present invention, if for example the temperature of the calculation processing unit is detected to be near the temperature that would cause malfunction, the supply of electric power to the calculation processing device can be automatically stopped by the power control means, thereby preventing malfunction of and damage to the calculation processing unit and making it possible to easily prevent the occurrence of runaway programs, etc.

In this invention, it is preferable that the electronic device has a status display means that displays the status of the supply of electric power to the electronic device, and is constituted so that when a temperature abnormality of the calculation processing unit is detected by the temperature detection means, the power control means outputs to the status display means a signal indicating that there is a temperature abnormality.

In this way, the status of the supply of electric power to the electronic device, in other words, the status of the calculation processing unit can be confirmed visually, and if for example a simulation game or role-playing game is being played on a video game device, which is an electronic device, then the data can be saved or some similar step can be taken before the calculation processing unit causes malfunction or is damaged.

It is desirable that the status display means consists of multiple light emitters that emit light in different colors in order to display the power supply status, and is constituted so that when a signal indicating that there is a temperature abnormality, is input, one of the light emitters flashes.

Here, a light-emitting diode (LED) may be as a light emitter. Specifically, it is desirable that a green LED may be used that emits light when the switch is closed and power has been supplied from the power source unit to the calculation processing unit and a red LED that emits light when the switch is open and power from the power source unit to the calculation processing unit has been stopped, and that the red LED flash when there is a temperature abnormality.

In this way, the status of the supply of electric power to the electronic device, or the status of the calculation processing unit, can be confirmed at a glance by the light emitted by the light emitters, and it is easy to stop a program that is being operated on the electronic device, or to save the data, before the calculation processing unit causes malfunction or is damaged.

If, for example the color of the light emitted from the light emitter is divided according to the status of the supply of electric power to the electronic device, it is possible to recognize the status of the electronic device by color of light, so it is easily recognized by the user, and in this way, it is also possible to easily stop a program that is being operated on the electronic device, or to save the data, before the calculation processing unit causes malfunction or is damaged.

In addition, because the light emitter flashes only if the calculation processing device is at an abnormal temperature, the status of the calculation processing unit can be recognized by the user even more simply, making it possible to easily stop a program that is being operated on the electronic device, or to save the data, before the calculation processing unit causes malfunction or is damaged.

It is preferable that the electronic device has a heat dissipation means that is closely connected to the calculation processing unit and radiates to the outside the heat that is produced from the calculation processing unit, and that a temperature detection means is provided on the heat dissipation means.

In this way, the heat produced from the calculation processing device is absorbed by the heat dissipation means and is radiated to the outside, thus making it possible to simply detect the temperature of the calculation processing unit by detecting the temperature of the heat dissipation means. And the installation of the temperature detection means can be made easier because it suffices to provide it on the heat dissipation means rather than on the calculation processing unit.

Also, it is desirable that the calculation processing device has a calculation processing unit that calculation-processes software information and an image processing unit that forms output images based on the calculation results of this calculation processing unit, and that the heat dissipation means is arranged straddling the calculation processing unit and image processing unit.

Here, the calculation processing unit and the image processing unit are among the processing units used in the electronic device and are divided into the parts that generate the most heat.

Thus, if a heat dissipation means that straddles them is provided and the temperature of this heat dissipation means is detected with a temperature detection means, then the power control means can automatically stop the supply of electric power when the temperature of either the calculation processing unit or the image processing unit rises above a value near the temperature at which malfunction occurs or it is damaged.

This makes it possible to easily prevent malfunction and damage of the calculation processing device without trouble, even if multiple processing units are provided that generate much heat.

An electronic device of this invention is one that has a calculation processing unit which calculation-processes the software information that is input and a power source unit that supplies electric power to this calculation processing unit. The electronic device includes a temperature detection means that detects the temperature of the calculation processing device and a status display means that displays the status of the supply of electric power from the power source unit to the electronic device, and when a temperature abnormality of the calculation processing unit is detected by the temperature detection means, a signal indicating that there is a temperature abnormality is input from said temperature detection means to the status display means.

With the present invention, the user can be informed of the temperature state before the calculation processing unit causes malfunction or is damaged. If the user can know in advance the heat generation status of the calculation processing unit, for example when the temperature of the calculation processing unit reaches or exceeds a value near the temperature at which it causes malfunction or is damaged, the temperature of the calculation processing unit can be lowered by applying cold air to the electronic device. This makes it possible to easily prevent malfunction or damage of the calculation processing device. Because the temperature status of the calculation processing unit can be confirmed visually, it is possible to easily stop a program that is being operated on the electronic device, or to save the data or take some other action, before the calculation processing unit causes malfunction or is damaged.

DETAILED DESCRIPTION OF THE PREFERRED EMBODIMENT

In the following, with reference to the drawings, an embodiment of this invention will be explained.

Figure 1:
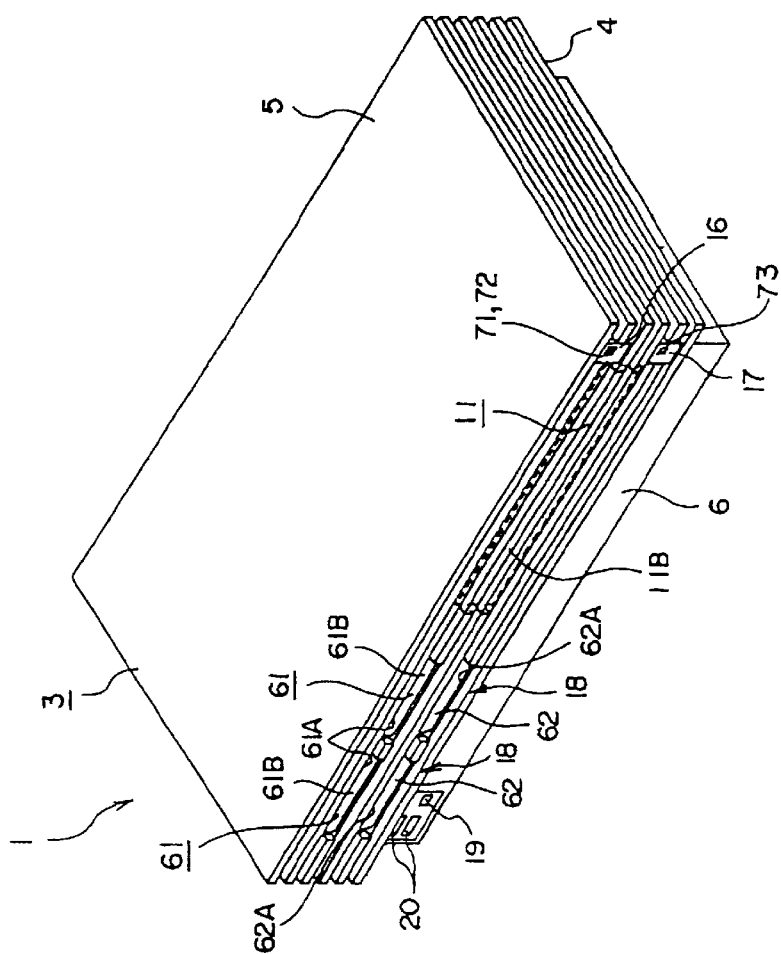
FIG. 1 is schematic, perspective view of a video game device in an embodiment of this invention.
Figure 2:
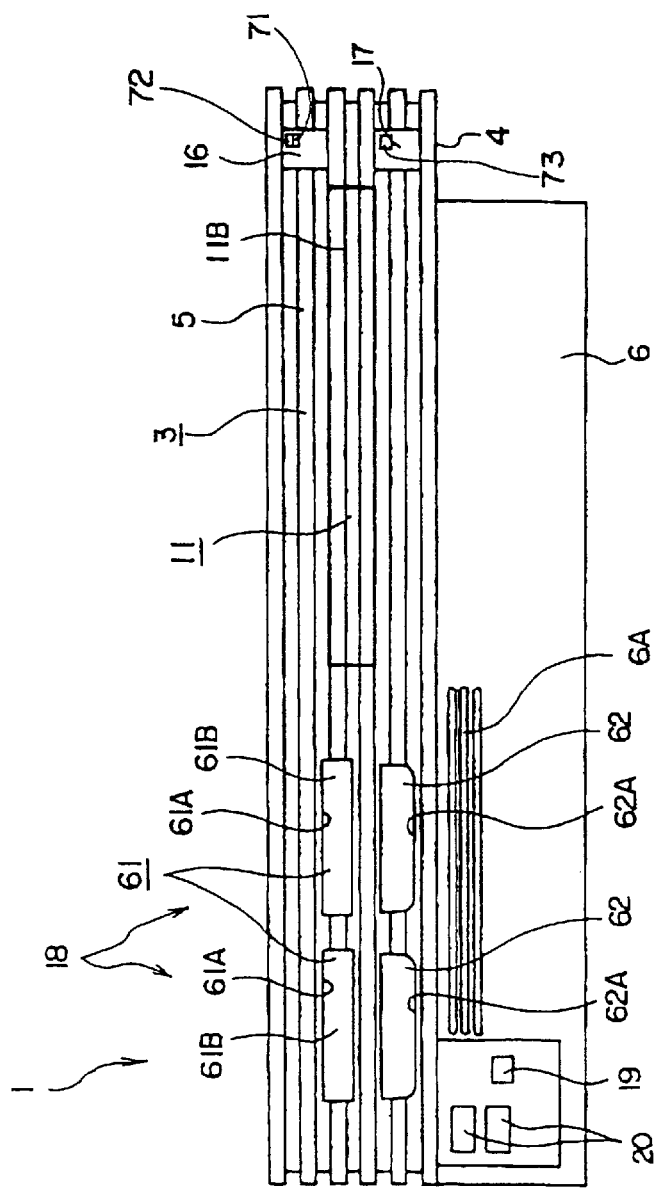
FIG. 2 is a front view of the video game device of FIG. 1.
Figure 3:
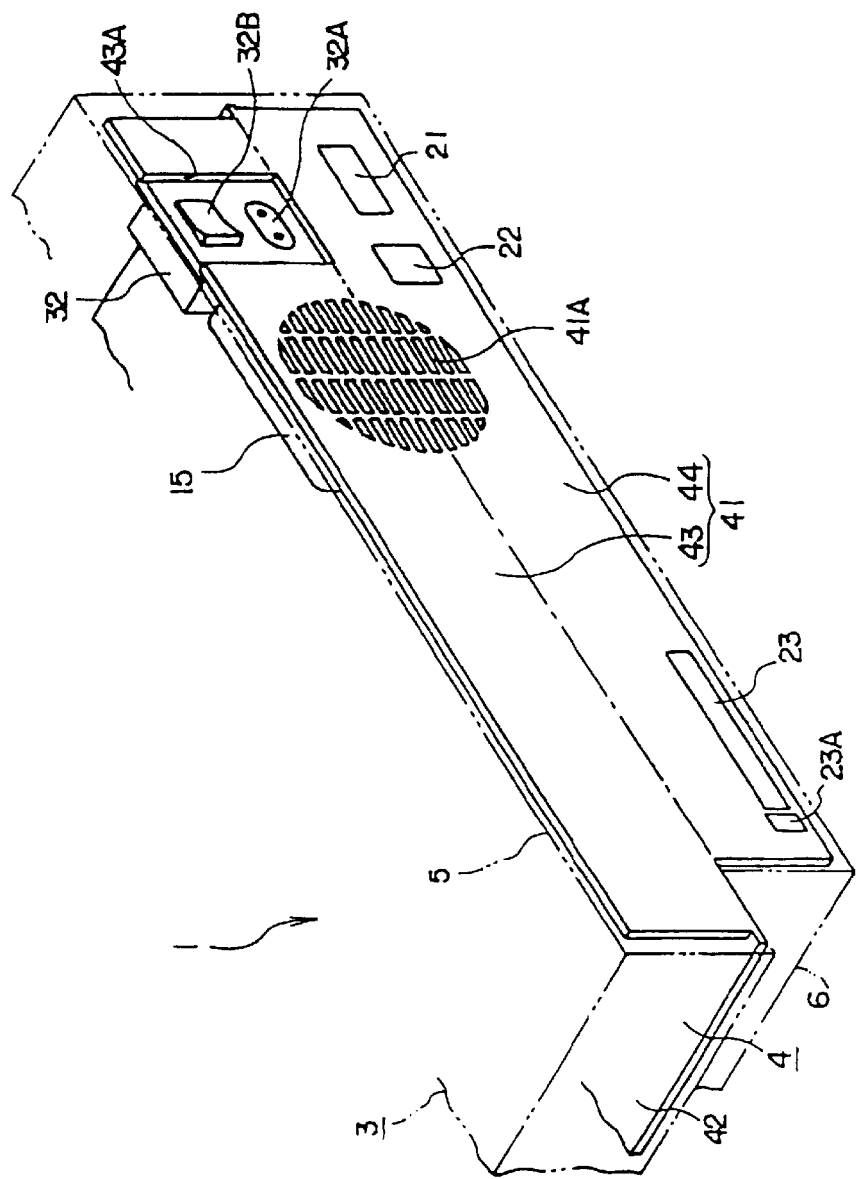
FIG. 3 is a perspective view of the video game device of FIG. 1.
Figure 4:
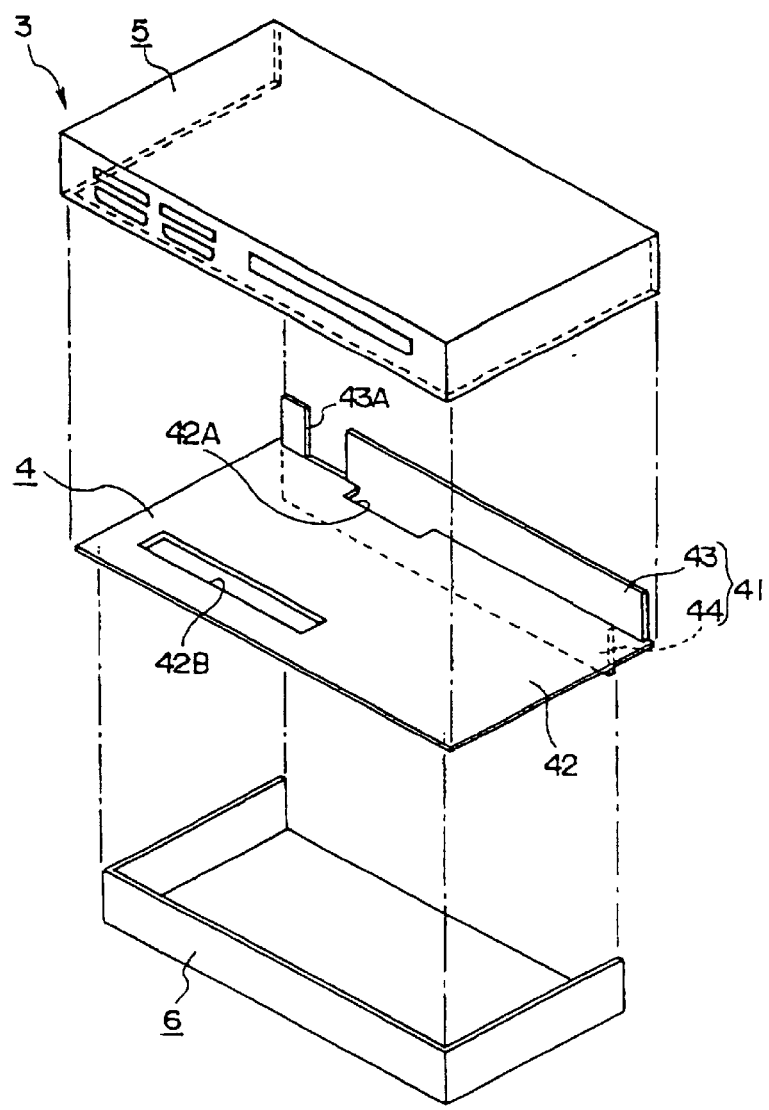
FIG. 4 is an exploded perspective view of a cabinet of the video game device of FIG. 1.
Figure 5:
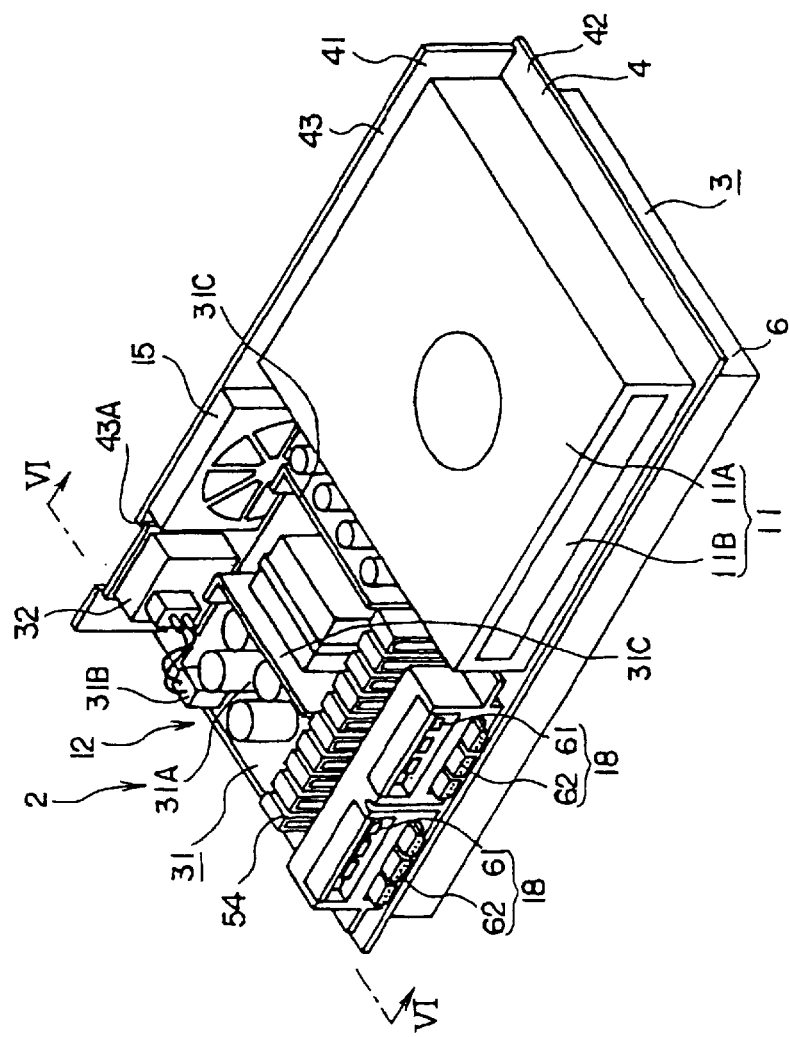
FIG. 5 is a perspective view of the interior structure of the video game device of FIG. 1.

FIGS. 1 to 5 are schematic, views of a video game device 1 which is an electronic device according to an embodiment of the present invention. FIG. 1 is a perspective view of device 1 seen from above, FIG. 2 is a front view of device 1 seen from the front, FIG. 3 is a perspective view of device 1 seen from the rear, FIG. 4 is an exploded perspective view of a cabinet 3, and FIG. 5 is a perspective view of the interior of device 1 seen from above.

Video game device 1, for example, reads a game program recorded on an optical disk or other medium and executes it according to instructions from the users (game players). "Executing a game" means mainly controlling the progress of the game as well as display and sound.

The video game device 1 includes a main body 2 (FIG. 5), which has electronic components, etc., and a video game device cabinet 3 (hereafter called the cabinet), which houses the main body 2.

As shown in FIG. 4, cabinet 3 has a central chassis 4, in which the main body 2 is provided, and an upper case 5 and a lower case 6, which hold central chassis 4 between them and house the main body 2, and it is formed in a square on the plane and in roughly L shape in front.

On the front right side (the right side as seen from the front) of upper case 5 is provided a disk device 11 (FIG. 1), which controls the operation of a CD-ROM (compact disk read-only memory), DVD-ROM (digital versatile disk ROM or digital video disk ROM), or other optical disk, and which is a storage medium on which video game application programs are recorded, and disk tray 11B of the disk device 11 is exposed.

On the right side (the right side as seen from the front) of disk tray 11B are arranged, on top and bottom, a power switch 16 and a tray operation switch 17 for performing the operation of inserting the disk tray 11B into and ejecting it from upper case 5.

Provided in the middle of the front surface of power switch 16 are red light-emitting diode (hereafter "red LED") 71 and green light-emitting diode (hereafter "green LED") 72, which are light emitters as a status display means that displays the status of the supply of electric power to video game device 1. The red LED 71 and green LED 72 are unitized, and constituted so that either one or the other emits light.

Provided in the middle of the front surface of the tray operation switch 17 is a blue light-emitting diode (hereafter "blue LED") 73, which is a light emitter that displays the operation status of disk device 11.

On the front left side (the left side as seen from the front) of upper case 5, two slots 18 are exposed. Each slot 18 has a memory card insertion unit 61 positioned at the top and a controller connection unit 62 positioned at the bottom.

A memory card or other external auxiliary memory device is inserted into a memory card insertion unit 61, and its insertion hole 61A is formed in the shape of a rectangle that is long in its longitudinal direction. Provided on this memory card insertion unit 61 is a shutter 61B for protecting the connection terminal that is provided inside it.

Controller connection unit 62 is an input-output terminal for performing input and output of signals, to which is connected a connection terminal formed at the end of a controller cable that extends from a controller serving as an operation device. Its insertion hole 62A is formed approximately in the shape of a rectangle that is long in its longitudinal direction, with the lower corners shaped rounder than the upper corners.

By forming insertion hole 62A in this way, the connection terminal of the controller is kept from being connected upside-down. Because the shape of insertion hole 62A is given a different structure from the shape of insertion hole 61A for memory card insertion unit 61, there is no danger of erroneously inserting an external auxiliary memory device into insertion hole 62A.

Having two of these controller connection units 62 makes it possible to connect two controllers, allowing two users to play competitive games, etc.

The results of operating each controller connected to controller connection units 62 are recorded onto an external auxiliary memory device inserted into memory card insertion unit 61 located above each.

Figure 6:
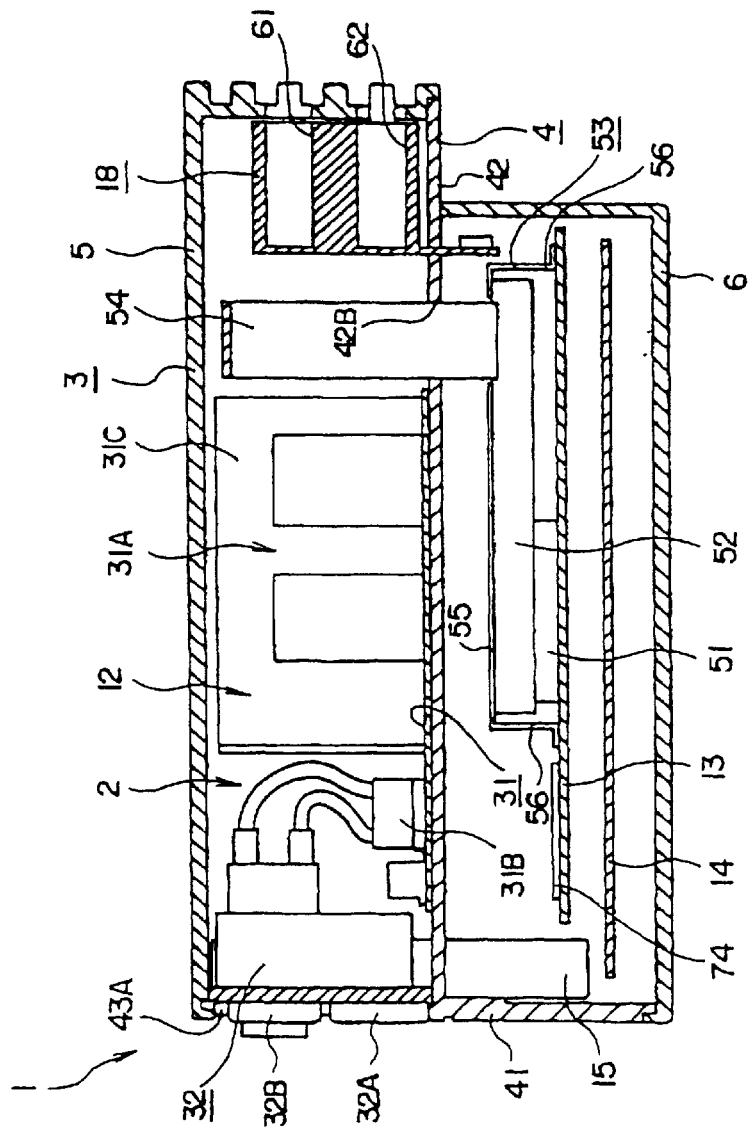
FIG. 6 is a cross-sectional view taken along line VI—VI of FIG. 5.

The front surface and right-side surface (the side surface on the right side as seen from the front) of lower case 6 lie inside the corresponding front surface and right-side surface of upper case 5 above it. In other words, the width and depth of lower case 6 are set smaller than the width and depth of upper case 5, and the volume of lower case 6 is set smaller than the volume of upper case 5. On the other hand, the left-side surface (the side surface on the left side as seen from the front) of lower case 6 matches the corresponding surface of upper case 5. Thus cabinet 3 is constructed asymmetrically about central chassis 4 (FIGS. 2 and 6).

The plane surrounded by the front surface and side surfaces of lower case 6 constitutes the lower surface that comes into contact with the floor (not shown). That is, video game device 1 is put into horizontal orientation extending horizontally by putting the lower surface of lower case 6 onto the floor.

Exposed on the front left side (the left side as seen from the front) of lower case 6 are a data transfer terminal 19 and two external device connection terminals 20 for connecting external devices.

Data transfer terminal 19 conforms to the IEEE 1394 standards, and by connecting a cable connected to this terminal to a digital camera or video deck, etc., one can take into video game device 1 the image and sound, etc. recorded with the digital camera or video deck.

The two external device connection terminals 20 conform to the USB (universal serial bus) standards and allow one to connect a keyboard or other input device, a mouse or other pointing device, a printer or other printing device, or an external memory device, etc. that employs a magnetooptical disk or other magnetic medium.

Formed on the front of lower case 6, along its longitudinal direction, are slit-like openings 6A for letting in air taken in from outside as cooling air into the interior of device 1.

As shown in FIGS. 3 and 4, central chassis 4 has, and is formed integrally with a rear surface part 41, which forms the rear surface of video game device 1, and a board-like middle shelf 42, which is provided so as to be perpendicular in the middle part of this rear surface part 41 in the height direction.

Rear surface part 41, which covers the rear surface of cabinet 3, consists of an upper rear surface part 43, which is formed approximately in the shape of a rectangle and is long enough to block part of the rear surface of upper case 5, and a lower rear surface part 44, which is formed approximately in the shape of a rectangle and is long enough to block part of the rear surface of lower case 6.

As shown in FIG. 4, a rectangular notch 43A is formed near the right end edge of upper rear surface part 43 in FIG. 3. Arranged in notch 43A are an AC inlet 32A, which is a power supply terminal for supplying power from an external power source to main body 2, and a main power switch 32B, which operates the supply of power from an external power supply.

Exposed near the right end edge of lower rear surface part 44 in FIG. 3, below the notch 43A, is a video-audio output terminal 21 for outputting video, audio and other signals recorded on an optical disk to a television or other display device.

Exposed next to video-audio output terminal 21 is an optical output terminal 22, which outputs digital signals to external devices. If, for example, an MD recorder is connected to the optical output terminal 22, sound recording can be done onto the MD recorder with no degradation of the digital audio signal, etc. that is recorded on an optical disk.

Exposed near the left end edge of lower rear surface part 44 in FIG. 3 is a PCMCIA slot 23, into which are inserted various card-type peripheral devices that conform to the PCMCIA standards, such as a memory card or modem card. A card-type peripheral device inserted into this PCMCIA slot 23 can be removed by a pressing an eject button 23A, which is exposed to the side of the PCMCIA slot 23.

Also, provided approximately in the center of rear surface part 41 are exhaust openings 41A, through which the air inside device 1 is expelled.

Middle shelf 42 is formed in the shape of a board having approximately the same width as upper case 5 and approximately the same depth as said upper case 5, and it is provided at right angles at the interface part of upper rear surface part 43 and lower rear surface part 44.

A notch 42A for accommodating an exhaust fan 15 is formed in the part of the middle shelf 42 that corresponds to exhaust openings 41A provided in rear surface part 41.

Figure 7:
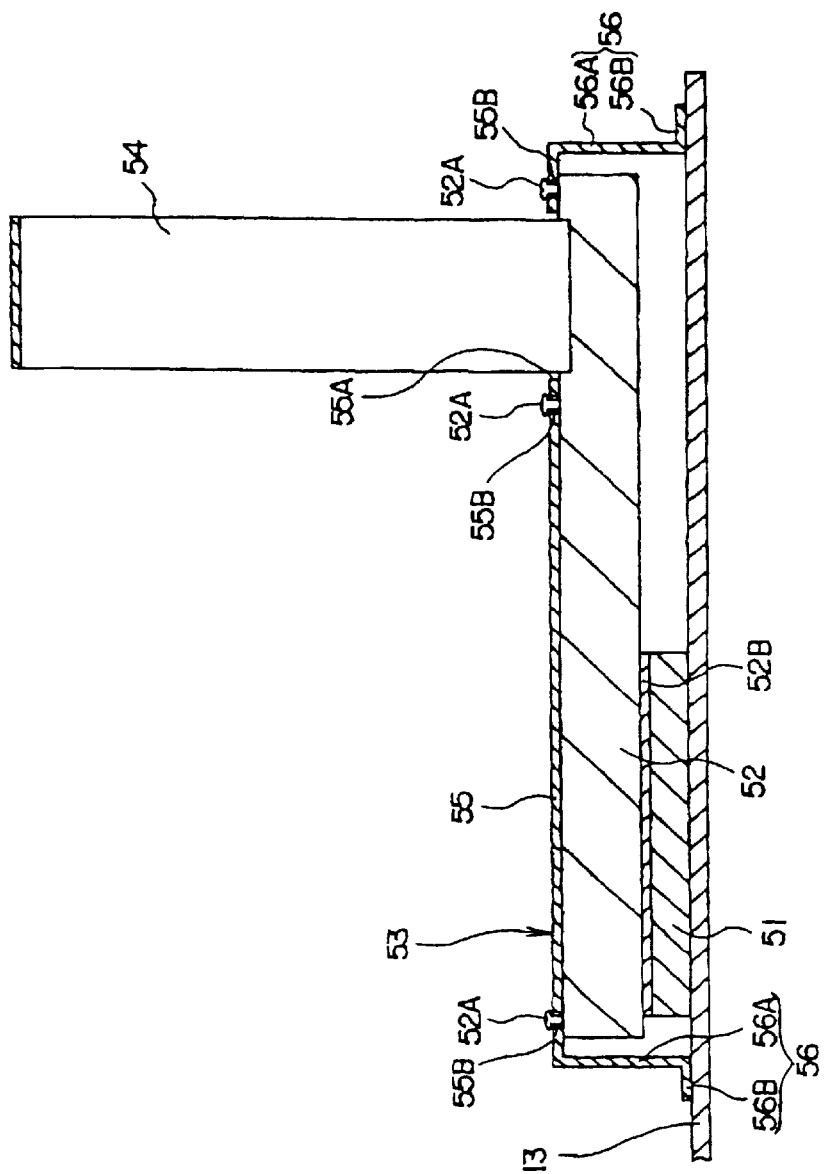
FIG. 7 is a cross-sectional view of a heat dissipation and shielding structure of the CPU of the video game device of FIG. 1.
Figure 8:
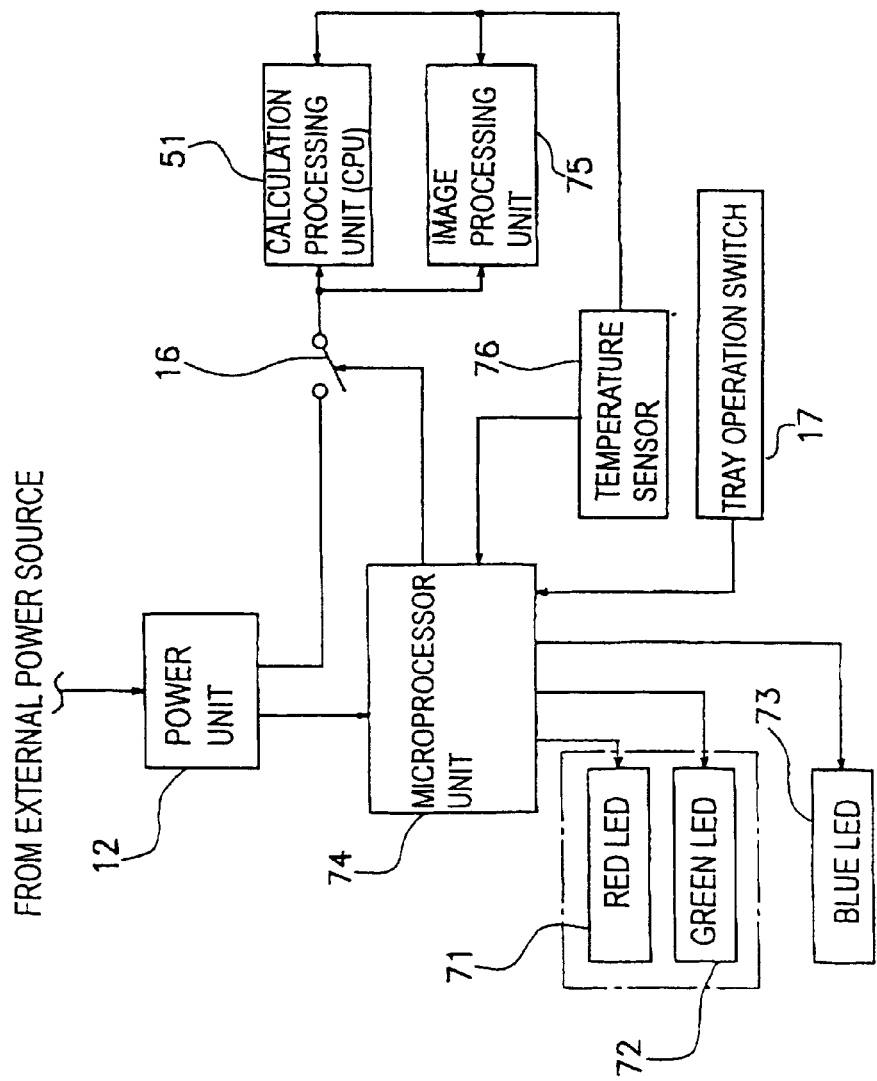
FIG. 8 is a block diagram showing the control of the operation of the video game device of FIG. 1.
Figure 9:
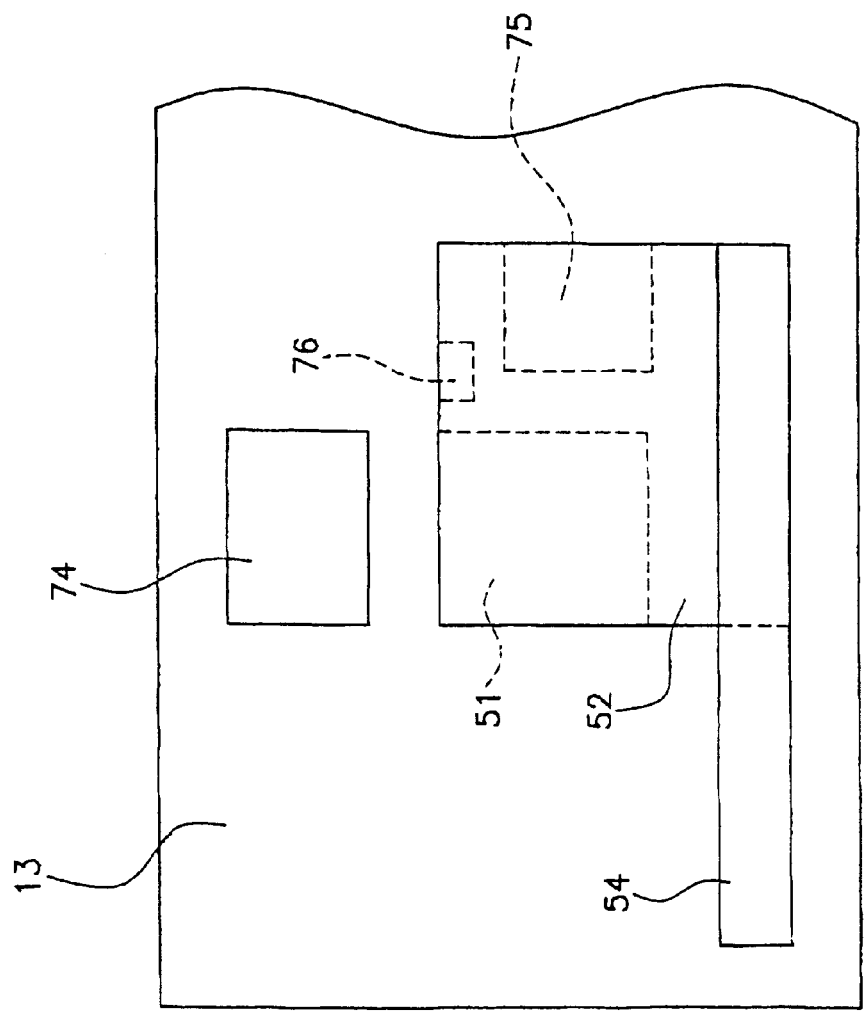
FIG. 9 is a schematic, plan view showing a main board of the device of FIG. 1.

FIGS. 5 to 9 show the internal structure of video game device 1. FIG. 5 is a schematic, perspective view of the interior of device 1; FIG. 6 is a perpendicular cross-sectional view of video game device 1; FIG. 7 is an enlarged cross-sectional view of the essential parts; FIG. 8 is a block diagram showing the control of the operation of video game device 1, and FIG. 9 is a schematic, plan view showing the essential parts.

In the drawings, the main body 2, which is provided on central chassis 4, is built into the interior, which is covered by upper case 5 and lower case 6.

Main body 2 of the device has the disk device 11, power source unit 12, which is a power source device, a main board 13, on which the calculation processing unit is mounted, and an input-output signal control board 14, etc.

Here, disk device 11 and power source unit 12 are arranged on middle shelf 42 of center chassis 4, and main board 13 and input-output signal control board 14 are arranged in layers in the space that is formed by middle shelf 42 and lower case 6. That is, disk device 11 and power source unit 12 on the one hand, and main board 13 and input-output signal control board 14 on the other hand, are arranged on opposite sides with center chassis 4 interposed.

Power source unit 12 has power source circuit board 31, which is mounted on middle shelf 42 of center chassis 4, and power source unit 32, into which electric power is input from an external power source.

Power source unit 32 has the aforesaid AC inlet 32A and main power switch 32B, and is connected to power source circuit board 31 via connector 31B. That is, electric power from an external power source is supplied to power source circuit board 31 through AC inlet 32A by turning on main power switch 32B.

Power source circuit board 31 occupies approximately half the plane area of middle shelf 42, and electric power supplied from an external power source is converted to the prescribed voltage by capacitors, coils, transformers, and other circuit element 31A that make up said power source circuit board 31. Here, provided on power source circuit board 31 is flat L-shaped guide plate 31C for directing into the prescribed direction the cooling air that is brought in through openings 6A formed in the front surface of the lower case 6.

In this way, power source unit 12 supplies to disk device 11 and boards 13, 14, etc. the power that is obtained by power source circuit board 31.

Attached on the side of exhaust outlet 41A of the power source unit 12 is exhaust fan 15 in a position that corresponds to the exhaust outlet 41A. This exhaust fan 15 is also driven by the electric power from power source unit 12.

Arranged on the side of exhaust outlet 41A of power source unit 12 and near openings 6A on the opposite side are rectangular heat sinks 54 and slots 18 described below.

Disk device 11 plays a CD-ROM, DVD-ROM, or other optical disk and includes and consists of device main body 11A, inside which an optical pickup unit (not shown) is accommodated, and said disk tray 11B, by which an optical disk is loaded onto this device main body 11A, and the disk device 11 is placed on middle shelf 42 in the space next to power source unit 12.

Provided in a position closest to and opposite the lower surface of middle shelf 42 is main board 13, which has a control system (not pictured) that includes a central processing unit (CPU) 51 and its peripheral devices, etc., a graphic system (not pictured) that includes an image processing unit 75, which forms output images based on signals from CPU 51, and a sound system (not pictured) that includes an audio processing unit that generates music and sound effects, etc., and a microprocessor unit 74, which is a power control means that controls the supply of electric power from power source unit 12 to the control system, graphic system, and sound system, etc.

The control system has CPU 51, a peripheral device controller that performs interrupt control and control of direct memory access (DMA) data transfers, etc., a main memory that consists of random access memory (RAM), and a read-only memory (ROM) in which are stored programs such as the so-called operating system, which manages and controls the main memory, graphic system, and sound system, etc. The "main memory" here refers to the memory in which programs can be executed.

CPU 51, which controls video game device 1 as a whole by executing (calculation-processing) the operating system, that is software information stored in ROM, consists of, for example, a 128-bit RISC (reduced instruction set computer) CPU.

The graphic system has an image processing unit 75, which renders pictures under drawing instructions from CPU 51, and a frame buffer in which images rendered by this image processing unit 75 are stored.

Image processing unit 75 draws polygons, etc. to the frame buffer in accordance with drawing commands from CPU 51. This image processing unit 75 is able to draw up to about 75 million polygons per second.

The sound system has an audio processing unit that plays background music and sound effects, etc. under instructions from CPU 51, and a sound buffer in which waveform data, etc. is stored by this audio processing unit.

Here, heat conducting member 52, which is a heat dissipation means and is made of high-thermal-conductivity aluminum, is attached by adhesive 52B to the top of such a CPU 51 and image processing unit 75, straddling the CPU 51 and image processing unit 75. Provided on the upper surface of the heat conducting member 52 are multiple T-shaped pins 52A spaced at prescribed intervals.

Provided on heat conducting member 52 is a temperature sensor 76, which is a temperature detection means that detects the temperature of CPU 51 and image processing unit 75.

The temperature sensor 76, which is attached by adhesive to the lower surface of heat conducting member 52, is a sensor-integrated integrated circuit (IC) that has a sensor part that detects the temperature of heat conducting member 52 and a signal conversion part that converts the detected temperature into a temperature detection signal.

CPU 51 and heat conducting member 52 are covered by shielding member 53, which is made of metal.

More specifically, shielding member 53 includes a flat shielding part 55, which comes into contact with the upper surface of heat conducting member 52, and side shielding parts 56, which have an L-shaped cross section extending from both ends of this flat shielding part 55 to the upper surface of main board 13.

Formed on flat shielding part 55 are holes 55B, which are positioned to correspond to pins 52A provided on the upper surface of heat conducting member 52. That is, by inserting pins 52A into these holes 55B and making the upper part of pins 52A protrude against the upper surface of flat shielding part 55, flat shielding part 55 is engaged by pins 52A and is anchored onto heat conducting member 52.

Each side shielding part 56 has vertical part 56A, which extends downward from the end of flat shielding part 55, and horizontal part 56B, which extends horizontally outward from the end of this vertical part 56A and whose lower surface comes into contact with the upper surface of main board 13.

Providing the shielding member 53 makes it easy to keep outside disturbances such as noise generated from input-output signal control board 14 or power source unit 12 from intruding into CPU 51, and makes it possible to securely maintain the stable operation of CPU 51.

Rectangle-shaped rectangular heat sink 54, which is a heat dissipation means, is provided on the upper surface of the end of heat conducting member 52. That is, rectangular heat sink 54 is positioned across heat conducting member 52 so as to straddle CPU 51 and image processing unit 75.

This rectangular heat sink 54 extends from the upper surface of heat conducting member 52 to near the top of upper case 5. Thus, as shown in FIGS. 4 and 7, openings 42B, 55A are formed in middle shelf 42 and flat shielding part 55 in positions corresponding to where rectangular heat sink 54 is provided.

Microprocessor unit 74 is a unit that controls the supply of electric power to main board 13 and disk device 11, etc., which make up video game device 1, and the output of aforesaid temperature sensor 76 is supplied to this microprocessor unit 74. That is, microprocessor unit 74 controls the supply of electric power from power source unit 12 to CPU 51 and image processing unit 75 on main board 13 based on the temperature abnormality detection signal from temperature sensor 76.

Microprocessor unit 74 and the temperature sensor 76 are connected directly to power source unit 12, and once main power switch 32B is turned on, they operate normally until main power switch 32B is pressed again and the supply of power from AC inlet 32A is stopped.

Also connected to the microprocessor unit 74, besides the temperature sensor 76, are tray operation switch 17, red LED 71, green LED 72, blue LED 73, and power switch 16.

Results of experiments revealed that, the temperature at which malfunction and damage of CPU 51 and image processing unit 75 occurs is about 80–90 degrees on average.

Input-output signal control board 14, which is arranged below said main board 13, has an optical disk controller (not pictured) that performs control of the optical disk on which application programs are recorded, as well as a communication controller (not shown) that controls the input and output, etc. of signals from the controllers into which instructions from the users are input, signals that are output to the controllers, and data from external auxiliary memory devices that store video game settings, etc.

The optical disk controller has a decoder that decodes the programs and data, etc. that are recorded with, for example, an appended error correction code (ECC), and a buffer that speeds up the reading of data from the optical disk by temporarily storing data from disk device 11.

Electrically connected to the communication controller is one end of each of slots 18, which consists of controller connection unit 62 and memory card insertion unit 61 (not shown). Accordingly, there are controlled the input and output of signals from the controllers into which instructions from the users are input, signals that are output to the controllers, and data from external auxiliary memory devices that store video game settings, etc. Also electrically connected to the communication controller are, besides slots 18, data transfer terminal 19, external device connection terminals 20, optical output terminal 22, and PCMCIA slot 23, etc. The communication controller also controls the input and output of signals with external devices, etc. connected to and inserted into these terminals, etc.

Figure 10:
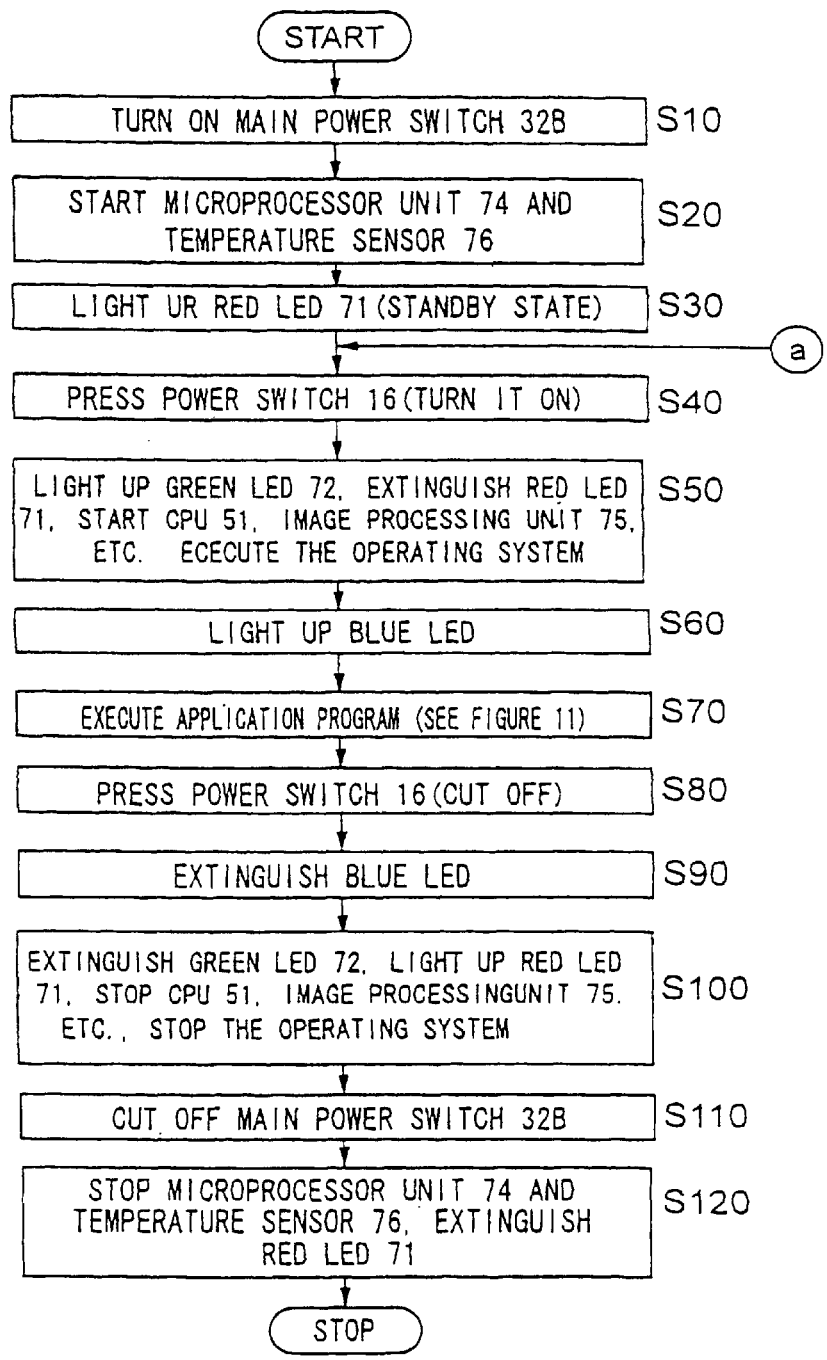
FIG. 10 is a flowchart that explains the operation of a main power switch, a power switch, a temperature sensor, and LEDs of the device of FIG. 1.
Figure 11:
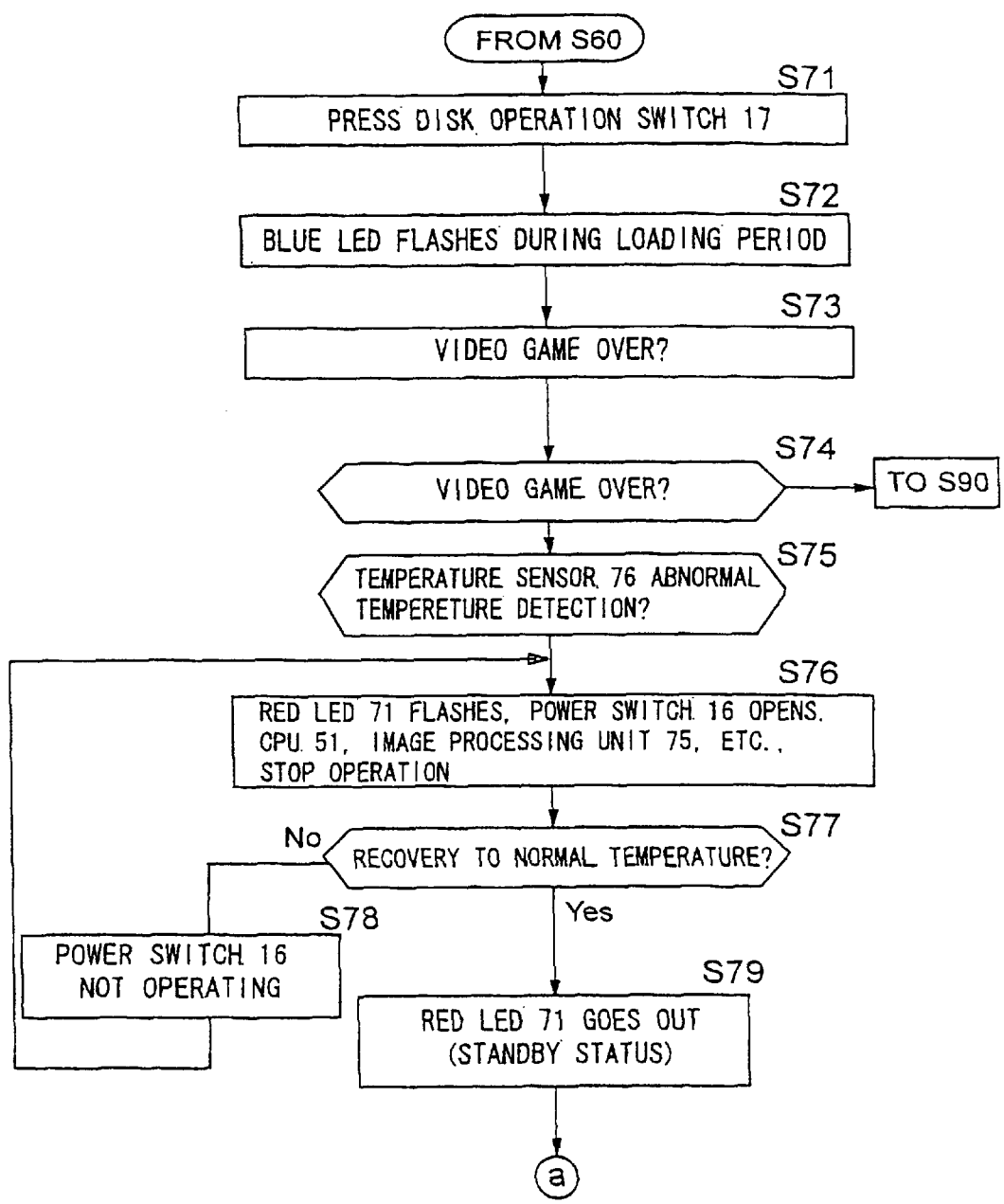
FIG. 11 is a flowchart that explains the details of the execution of the application program of step 70 in FIG. 10.

Referring to FIGS. 10 and 11, the operation status of the main power source, power switch, temperature sensor, and LEDs of video game device 1, which has the above internal structure will now be described.

When main power switch 32B is turned on (S10), electric power input from AC inlet 32A is converted and transformed by power source circuit board 31 and is supplied to microprocessor unit 74 and temperature sensor 76 (S20).

When electric power is supplied to this microprocessor unit 74, said microprocessor unit 74 starts and is initialized, and outputs to red LED 71 a signal indicating that main power switch 32B has been turned on, causing the red LED 71 to light up. Thus when main power switch 32B is turned on, red LED 71 lights up (standby status) (S30).

Meanwhile, when electric power is supplied to temperature sensor 76, said temperature sensor 76 detects and monitors the temperature of heat conducting member 52.

Next, when power switch 16 is pressed (S40), microprocessor unit 74 outputs to green LED 72 a signal indicating that power switch 16 has been turned on, causing said green LED 72 to flash and extinguishing red LED 71.

Meanwhile, electric power is supplied to the control system of main board 13, the graphic system, and the sound system, etc., and CPU 51 and image processing unit 75, etc. are activated. Also, CPU 51 executes the operating system stored in ROM, thus controlling said graphic system, sound system, etc. on this operating system (S50). In this status, blue LED 73 is lit (S60).

When the operating system is executed, CPU 51, after performing initialization of video game device 1 as a whole, including confirmation of operation, controls said disk device 11 and reads in the game or other application program recorded on the optical disk, and executes it on the operating system (S70).

By execution of this game or other program, CPU 51 controls the graphic system, sound system, etc. in accordance with the input from the users and carries out control of the image display and control of the sound effects, background music, and other output.

The operation during execution of this game or other program will be described later, referring to FIG. 11. When the game or other program ends, pressing power switch 16 (S80) causes the blue LED 73 to go out (S90). Thereafter, green LED 72 goes out, red LED 71 lights up, CPU 51, image processing unit 75, etc. stop their operation, and the operation program stops (S100).

Next, when main power switch 32B is cut off (S110), microprocessor 74 and temperature sensor 76 stop, and red LED 71 goes out (S120).

Next, referring to FIG. 11, the operation during execution of a game or other program will be described. Here, when an optical disk is loaded onto disk device 11 or an optical disk is unloaded from disk 11, pressing tray operation switch 17 causes a signal indicating that tray operation switch 17 has been pressed to be input to microprocessor unit 74.

Based on this signal, microprocessor unit 74 causes blue LED 73 to flash. That is, blue LED 73 flashes during loading of disk tray 11B (while it is being inserted or ejected) (S73).

Other than during loading of disk tray 11B, this blue LED 73 is lit if an optical disk is mounted in disk tray 11B.

The video game begins (S73). And during use of video game device 1, the heat generated by CPU 51 is dissipated into the interior of device 1, transmitted through heat conducting member 52 and rectangular heat sink 54. The heat that is emitted is exhausted to the exterior of device 1 by exhaust fan 15, together with the heat from power source unit 12 and the heat generated from disk device 11.

Rectangular heat sink 54, CPU 51, power source unit 12, etc. are cooled by the cooling air sucked into the interior of device 1 through openings 6A. This improves the cooling efficiency of the interior of said device 1. The cooling air, after cooling the interior of device 1, is directed by guide plate 31C, etc. and is exhausted through exhaust openings 41A to the rear side of device 1 by exhaust fan 15.

In doing so, if video game device 1 is used for a long time and the temperature of CPU 51, image processing unit 75, that is, the temperature of heat conducting member 52, is detected by temperature sensor 76 to be an abnormal temperature (for example 70–75 degrees) near the temperature at which malfunction or damage occurs (S74), the detected temperature is input from the temperature sensor 76 to microprocessor unit 74 as a temperature abnormality detection signal.

Based on the temperature abnormality detection signal, microprocessor unit 74 outputs to red LED 71 a signal indicating that the temperature of CPU 51 or image processing unit 75 is abnormal, causing the red LED 71 to flash. That is, red LED 71 flashes when the temperature of CPU 51 or image processing unit 75 approaches the temperature at which malfunction or damage is caused.

Meanwhile, based on the temperature abnormality detection signal, microprocessor unit 74 performs control to open power switch 16. This stops the supply of electric power to CPU 51 and image processing unit 75, stops the operation of CPU 51 and image processing unit 75, and stops the generation of heat.

Also, if power switch 16 is opened, video game device 1 returns to a state (standby state) in which it is brought when main power switch 32B is turned on (S76).

The temperature of heat conducting member 52 is continuously monitored by temperature sensor 76 (S77). If the standby state is entered due to a temperature abnormality of CPU 51 or image processing unit 75, red LED 71 flashes and video game 1 does not start in this state, even upon pressing power switch 16, as long as a temperature abnormality detection signal is input into microprocessor 74 from temperature sensor 76, that is, as long as the temperature of CPU 51 and/or image processing unit 75 is at an abnormal temperature near the temperature that would cause malfunction or damage (S78).

If, after a predetermined period of time elapses, the temperature of CPU 51 and/or image processing unit 75 goes down and a temperature abnormality detection signal is no longer input from temperature sensor 76, microprocessor unit 74 concludes that CPU 51 and image processing unit 75 are capable of normal operation and causes red LED 71 to light up (S79).

Thus, when red LED 71 lights up, it becomes possible to start video game device 1 by pressing power switch 16 (S40).

If, when a temperature abnormality detection signal is input from temperature sensor 76, tray operation switch 17 is pressed and disk tray 11B is in the midst of loading, then microprocessor unit 74 performs control to cause red LED 71 to flash and to open power switch 16, as soon as the loading operation ends.

With an embodiment such as this, the following effects are obtained.

Namely, if the temperature of CPU 51 and/or image processing unit 75 is detected to be near the temperature at which malfunction or damage occurs, the supply of electric power to CPU 51 and image processing unit 75 can be automatically stopped by microprocessor unit 74, thereby preventing malfunction or damage of CPU 51 and image processing unit 75 and easily preventing the occurrence of a runaway program, etc.

When a temperature abnormality of CPU 51 and/or image processing unit 75 is detected, a signal indicating that there is a temperature abnormality is output from microprocessor unit 74 to red LED 71, allowing one to confirm visually the status of CPU 51 and image processing unit 75. In this way, if for example a simulation game or role-playing game is being played on video game device 1, then the data can be saved or some similar action can be taken before CPU 51 or image processing unit 75 malfunctions or is damaged.

And if the temperature of CPU 51 and/or image processing unit 75 is near the temperature at which malfunction or damage occurs, red LED 71 is made to flash, allowing one to confirm at a glance, by its flashing, the status of CPU 51 and image processing unit 75. This makes it easy to stop the program operating on video game device 1 or to save the data or take some similar step before CPU 51 or image processing unit 75 malfunctions or is damaged.

Because red LED 71 flashes only if CPU 51 or image processing unit 75 is having a temperature abnormality, it is even simpler for the user to confirm the status of CPU 51 and image processing unit 75, and even in view of this point one can more easily stop the program operating on video game device 1, save the data, or take some similar step before CPU 51 and image processing unit 75 malfunctions or is damaged.

Because temperature sensor 76 is attached to heat conducting member 52, the heat that is generated from CPU 51 and image processing unit 75 is radiated to the outside by heat conducting member 52 and rectangular heat sink 54, thus making it possible to detect the temperature of CPU 51 and image processing unit 75 simply, by detecting the temperature of heat conducting member 52.

Since it suffices to provide the temperature sensor 76 on heat conducting member 52 rather than on each of CPU 51 and image processing unit 75, it can be installed easily.

Because heat conducting member 52 is positioned straddling CPU 51 and image processing unit 75, if one detects with temperature sensor 76 the temperature of this heat conducting member 52, then when the temperature of either of CPU 51 and image processing unit 75 reaches or exceeds a value near the temperature that causes malfunction or damage, the supply of electric power can be automatically stopped by microprocessor unit 74, making it easy to prevent malfunction or damage of CPU 51 and/or image processing unit 75.

This invention is not limited to the above embodiment but includes other arrangements, etc. that can achieve the purposes of this invention, including modifications such as the following.

For example, in the above embodiment, microprocessor unit 74 is constituted so as to control the electric power to CPU 51, etc., but it is not limited to this; for example, it may have a composition in which it outputs only a signal based on the temperature abnormality detection signal.

By this arrangement, the user can be notified of the temperature status before CPU 51 and/or image processing unit 75 cause malfunction. And if the user is able to know in advance the heat generation status of CPU 51 and image processing unit 75, then if for example the temperature of CPU 51 and image processing unit 75 reaches or exceeds a value near the temperature at which malfunction or damage is caused, the temperature of CPU 51 and image processing unit 75 can be lowered by directing cold air to video game device 1, and one can easily prevent malfunction or damage of CPU 51 and image processing unit 75. And because the temperature status of CPU 51 and image processing unit 75 can be confirmed visually, one can easily stop the program operating on video game device 1, save the data, or take some similar step before CPU 51 or image processing unit 75 malfunctions or is damaged.

In the above embodiment, heat conducting member 52 and rectangular heat sink 54 are arranged straddling CPU 51 and image processing unit 75, but it is not limited to this; for example, one may attach heat conducting member 52, rectangular heat sink 54 each to each of CPU 51 and image processing unit 75.

Also, in the above embodiment, temperature sensor 76 is attached to heat conducting member 52, but it is not limited to this; for example, the temperature sensor 76 may be attached to rectangular heat sink 54, and it may be attached directly to CPU 51, image processing unit 75.

Also, in the above embodiment, an LED is made to flash if the temperature of CPU 51 and image processing unit 75 reaches or exceeds a value near the temperature at which malfunction or damage occurs, but it is not limited to this; for example, the quantity of light of the LED may be made large, or conversely it may be extinguished, and operation of the LED in accordance with the state of video game device 1 may be suitably determined according to the implementation.

Moreover, in the above embodiment, red LED 71 and green LED 72 are used in order to display the state of supply of electric power to video game device 1, but it is not limited to this; for example, an orange LED or yellow LED may be used, or one may use a single-color LED and its quantity of light is varied. The way of the display may be chosen suitably for the implementation.

Also, the status display means is not limited to light-emitting diodes provided in the switches 16, 17 on the front of device 1; for example, a representation to this effect may appear on the game display screen, but the way to indicate the status may be suitably determined according to the implementation.

And the temperature detection means is not limited to a sensor-integrated integrated circuit; for example, it may be constituted with a sensor part consisting of a thermistor and an integrated circuit, separate from this sensor part, that converts the signal.

The electronic device of this invention is not limited to video game device 1; for example, it may be applied to a personal computer, audio equipment, a video camera, etc.; in short, one may adopt anything that has a calculation processing device that calculation-processes the input software information and a power source device that supplies electric power to this calculation processing device:

As stated above, the electronic device of this invention has the effect of making it easy to prevent malfunction and damage of the calculation processing device.

What is claimed is:

1. An electronic device comprising:
   a calculation processing unit that calculation-processes software information that is input;
   a power source unit that supplies electric power to said calculation processing unit;
   a temperature detection means that detects the temperature of said calculation processing unit;
   a power control means that controls supply of electric power from said power source unit to said calculation processing unit according to the temperature detected by said temperature detection means; and
   first and second LEDs that each emit light in a different color, the first LED lighting up to indicate a waiting status when a main switch is switched on for the electronic device, the first LED being extinguished while the second LED is lighting up when an electric power is switched on for an operation of said electronic device, said first and second LEDs being not lit simultaneously,
   wherein when the temperature that is detected by the temperature detection means is normal, in the waiting status the first LED lights up while the second LED is not lit and during said operation the first LED is extinguished while the second LED lights up, and
   wherein when the temperature is abnormal, the second LED is extinguished while the first LED flashes.

2. The electronic device as described in claim 1, further comprising:
   a status display means that displays the status of the supply of electric power to the electronic device wherein
   when a temperature abnormality of said calculation processing unit is detected by said temperature detection means, said power control means outputs to said status display means a signal indicating that there is a temperature abnormality.

3. The electronic device as described in claim 1, further comprising:
   a heat dissipation means that is closely connected to said calculation processing unit and radiates the heat that is produced from said calculation processing unit to the outside, wherein
   said temperature detection means is provided on said heat dissipation means.

4. The electronic device as described in claim 3, wherein said calculation processing unit includes a calculation processing means that calculation-processes software information and an image processing unit that forms output images based on the calculation results of said calculation processing means, and
   said heat dissipation means is attached closely, to and straddling both said calculation processing means and said image processing unit.

5. An electronic device comprising:
   a calculation processing unit that calculation-processes software information that is input;
   a power source unit that supplies electric power to said calculation processing device;
   a temperature detection means that detects the temperature of said calculation processing unit, and
   a status display means that displays the status of supply of electric power to the electronic device,
   wherein said temperature detection means, upon detecting a temperature abnormality of said calculation processing unit, outputs to said status display means a signal indicating that there is a temperature abnormality;
   wherein said status display means further comprises first and second LEDs that each unit light in a different color, the first LED lighting up to indicate a waiting status when a main switch is switched on for the electronic device, the first LED being extinguished while the second LED is lighting up when an electric power is switched on for an operation of said electronic device, said first and second LEDs being not lit simultaneously,
   wherein when the temperature that is detected by the temperature detection means is normal, in the waiting status the first LED lights up while the second LED is not lit and during said operation the first LED is extinguished while the second LED lights up, and
   wherein upon detecting a temperature abnormality, the second LED is extinguished while the first LED flashes.

* * * * *